(12) United States Patent
Barnett et al.

(10) Patent No.: US 9,779,519 B2
(45) Date of Patent: Oct. 3, 2017

(54) SYSTEMS AND METHODS FOR COLOR-BASED DYNAMIC MODIFICATION OF SHADOWS AND HIGHLIGHTS WITHIN MEDIA CONTENT

(71) Applicant: Facebook, Inc., Menlo Park, CA (US)

(72) Inventors: John Samuel Barnett, Newark, CA (US); Christopher James Connolly, San Francisco, CA (US); Timothy Edward Lenardo, San Francisco, CA (US); Joshua Barton Dickens, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/815,009

(22) Filed: Jul. 31, 2015

(65) Prior Publication Data

US 2017/0032541 A1  Feb. 2, 2017

(51) Int. Cl.
*G06T 11/00* (2006.01)
*G06T 11/60* (2006.01)

(52) U.S. Cl.
CPC ............ *G06T 11/001* (2013.01); *G06T 11/60* (2013.01)

(58) Field of Classification Search
CPC ........ G06T 5/007; G06T 5/008; G06T 11/001
See application file for complete search history.

(56) References Cited

U.S. PATENT DOCUMENTS

| 7,973,950 B1 * | 7/2011 | Tieskoetter | G06F 3/1205 358/1.13 |
| 8,854,370 B2 * | 10/2014 | Bryant | G11B 27/034 345/440 |
| 2014/0115536 A1 * | 4/2014 | Akiya | G06F 3/0482 715/810 |

* cited by examiner

*Primary Examiner* — Antonio A Caschera
(74) *Attorney, Agent, or Firm* — Sheppard Mullin Richter & Hampton LLP

(57) ABSTRACT

Systems, methods, and non-transitory computer-readable media can provide a first option to modify one or more shadow regions of a media content item. A second option to modify one or more highlight regions of the media content item can be provided. The second option can be provided in conjunction with the first option. A selection of at least one of the first option or the second option can be detected. At least one set of color swatches can be provided, based on the selection, for modifying at least one of: 1) the one or more shadow regions or 2) the one or more highlight regions.

20 Claims, 15 Drawing Sheets

SYSTEMS AND METHODS FOR COLOR-BASED DYNAMIC MODIFICATION OF SHADOWS AND HIGHLIGHTS WITHIN MEDIA CONTENT

FIELD OF THE INVENTION

The present technology relates to the field of media processing. More particularly, the present technology relates to techniques for color-based dynamic modification of shadows and highlights within media content.

BACKGROUND

Today, people often utilize computing devices (or systems) for a wide variety of purposes. Users can use their computing devices to, for example, interact with one another, access content, share content, and create content. In some cases, users of a social networking system (or service) can utilize their computing devices to create, edit, and post (or publish) media content items, such as images, videos, audio, and text. In one example, a user can capture an image, modify the image by applying a filter, and then share the image via the social networking system.

Under conventional approaches rooted in computer technology, editing or modifying media content items can, in some cases, be inconvenient or difficult for users. For instance, such conventional approaches to utilizing media content can require users to perform an unnecessarily large number of steps or tasks in order to achieve certain media editing effects. Moreover, conventional approaches to providing tools or features for editing or modifying media content items can often times be uninteresting or inefficient. As such, conventional approaches can create challenges for or reduce the overall user experience associated with utilizing media content.

SUMMARY

Various embodiments of the present disclosure can include systems, methods, and non-transitory computer readable media configured to provide a first option to modify one or more shadow regions of a media content item. A second option to modify one or more highlight regions of the media content item can be provided. The second option can be provided in conjunction with the first option. A selection of at least one of the first option or the second option can be detected. At least one set of color swatches can be provided, based on the selection, for modifying at least one of: 1) the one or more shadow regions or 2) the one or more highlight regions.

In an embodiment, it can be detected that a particular color swatch has been selected out of the at least one set of color swatches. A trigger to provide access to an interactive element for adjusting a color intensity associated with the particular color swatch can be detected. The access to the interactive element can be provided based on detecting the trigger.

In an embodiment, the trigger can be associated with at least one of a system setting, a tap gesture, a hold gesture, a swipe gesture, a mouse click operation, a mouse hold operation, a mouse hover operation, or a mouse drag operation.

In an embodiment, a modification can be dynamically applied, based on the selection, to a visual appearance associated with the at least one of: 1) the one or more shadow regions or 2) the one or more highlight regions. The modification can utilize, at least in part, the particular color swatch.

In an embodiment, a preview for the media content item can be dynamically presented based on the modification being applied to the visual appearance associated with the at least one of: 1) the one or more shadow regions or 2) the one or more highlight regions.

In an embodiment, a color intensity input can be acquired, via the interactive element, to adjust the color intensity associated with the particular color swatch. The modification can be dynamically updated based on the color intensity input.

In an embodiment, at least one of a value representing the color intensity input or a color intensity visualization representing the color intensity input can be dynamically presented.

In an embodiment, at least one of a maximum color intensity level or a minimum color intensity level for the color intensity associated with the particular color swatch can be determined. At least one of a maximum endpoint or a minimum endpoint of the interactive element can be associated, respectively, with the at least one of the maximum color intensity level or the minimum color intensity level. The interactive element can correspond to a scrollable element including the maximum endpoint and the minimum endpoint.

In an embodiment, determining the at least one of the maximum color intensity level or the minimum color intensity level can be based on at least one of manual effort or a machine-learning process.

In an embodiment, navigation through the at least one set of color swatches can be enabled. The at least one set of color swatches can include one or more distinct color swatches. The navigation through the at least one set of color swatches can include scrolling through at least some of the one or more distinct color swatches.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
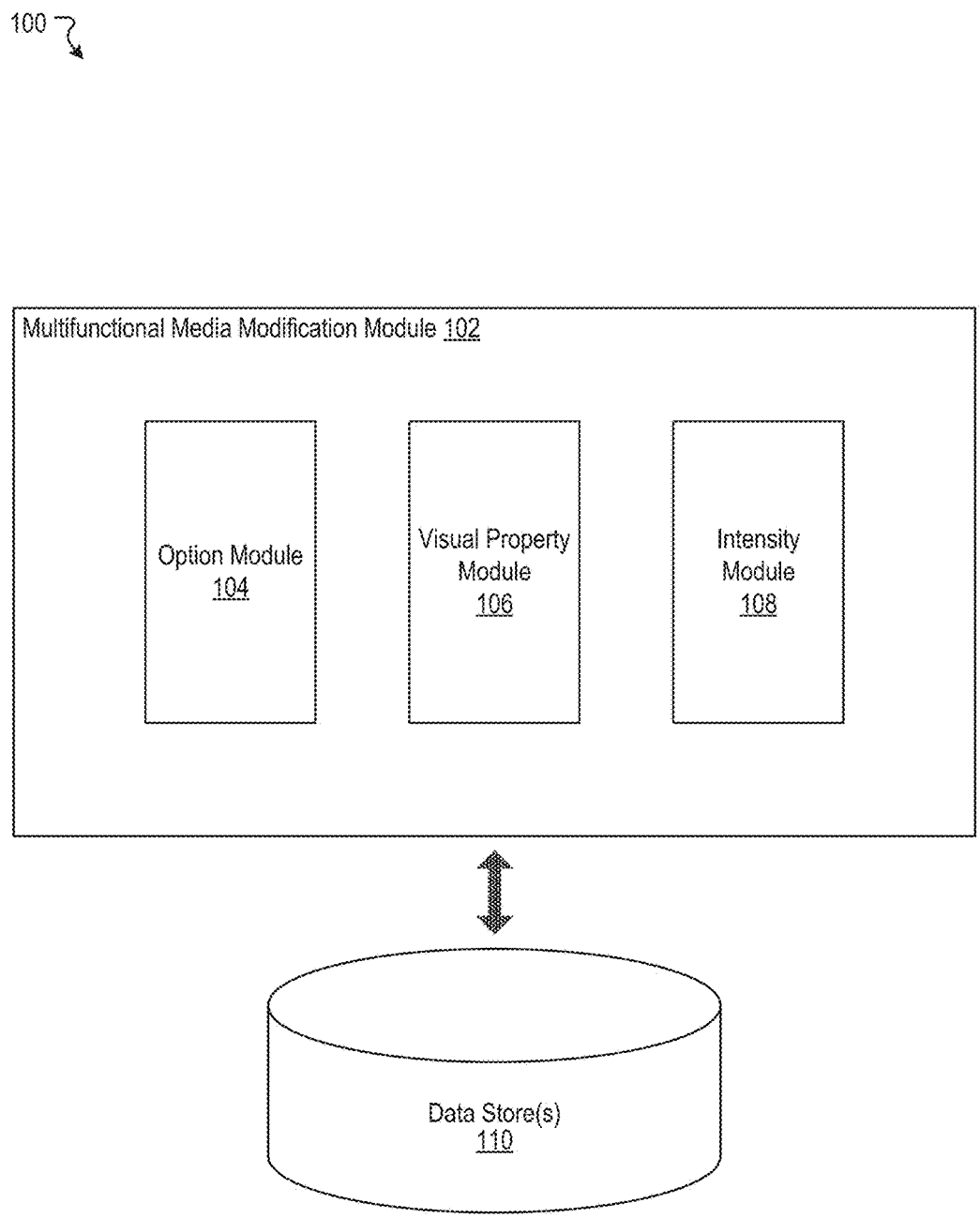
FIG. 1 illustrates an example system including an example multifunctional media modification module configured to facilitate color-based dynamic modification of shadows and highlights within media content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Color-Based Dynamic Modification of Shadows and Highlights within Media Content

People use social networking systems (or services) for various purposes. Users of a social networking system can utilize their computing devices (or systems) to establish connections, communicate, and interact with one another via the social networking system. Users can also provide, edit, share, or access media content items such as pictures, videos, audio, and text. In one instance, a user can utilize his or her computing device to modify one or more visual properties associated with a media content item, such as when editing the color or tint properties of an image (or other media content). The user can also modify (or edit) one or more shadow and/or highlight regions within the image. In this instance, the user can then share the modified image via the social networking system.

Under conventional approaches rooted in computer technology, modifying properties associated with media content can often require an undesirable amount of time, computing resources, and/or manual effort. Such conventional approaches to utilizing media content can be associated with inefficiencies or inconveniences, thereby making it cumbersome or challenging for users to modify properties associated with media content. It can be undesirable for users to perform an unnecessarily large number of steps or tasks in order to achieve certain media editing effects, such as when editing colors of shadow and/or highlight regions within an image. Furthermore, in many cases, conventional approaches to providing media editing tools or features can be uninteresting, static, or otherwise lacking in interactivity.

Due to these or other concerns, conventional approaches can be disadvantageous or undesirable. Therefore, an improved approach can be beneficial for addressing or alleviating various drawbacks associated with conventional approaches. Based on computer technology, the disclosed technology can provide color-based dynamic modification of shadows and highlights within media content. Various embodiments of the present disclosure can provide a first option to modify one or more shadow regions of a media content item. A second option to modify one or more highlight regions of the media content item can be provided. The second option can be provided in conjunction with the first option. A selection of at least one of the first option or the second option can be detected. At least one set of color swatches can be provided, based on the selection, for modifying at least one of: 1) the one or more shadow regions or 2) the one or more highlight regions. It is contemplated that there can be many variations and/or other possibilities associated with the disclosed technology.

FIG. 1 illustrates an example system 100 including an example multifunctional media modification module 102 configured to facilitate color-based dynamic modification of shadows and highlights within media content, according to an embodiment of the present disclosure. As shown in the example of FIG. 1, the multifunctional media modification module 102 can include an option module 104, a visual property module 106, and an intensity module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the multifunctional media modification module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the multifunctional media modification module 102 can be implemented, in part or in whole, as software running on one or more computing devices or systems, such as on a user or client computing device. For example, the multifunctional media modification module 102 or at least a portion thereof can be implemented as or within an application (e.g., app), a program, an applet, or an operating system, etc., running on a user computing device or a client computing system, such as the user device 710 of FIG. 7. In another example, the multifunctional media modification module 102 or at least a portion thereof can be implemented using one or more computing devices or systems that include one or more servers, such as network servers or cloud servers. In some instances, the multifunctional media modification module 102 can, in part or in whole, be implemented within or configured to operate in conjunction with a social networking system (or service), such as the social networking system 730 of FIG. 7. It should be understood that there can be many variations or other possibilities.

The option module 104 can be configured to facilitate providing a first option to modify one or more shadow regions of a media content item. The option module 104 can also be configured to facilitate providing a second option to modify one or more highlight regions of the media content item. In some cases, the second option can be provided in conjunction with the first option. For instance, the first and second options can be presented on a display element (e.g., display screen, touch screen, etc.) of a computing device (or system) at least temporarily at the same time or simultaneously. The computing device can implement or utilize the multifunctional media modification module 102 for editing or modifying the media content item.

In general, highlight regions can include some of the lightest or brightest areas (e.g., one or more pixels) of the media content item, such as an image. One or more portions within an image where a significant amount of light is illuminating (e.g., when illumination satisfies a suitable threshold value) and/or where colors or tones are relatively lighter (e.g., when color or tones satisfy a suitable threshold value) can be referred to as highlight regions. In contrast, shadow regions can generally include some of the darkest or dimmest areas of the media content item. One or more portions within an image that are lacking or devoid of light (e.g., when illumination satisfies a suitable threshold value) and/or that have relatively darker colors or tones (e.g., when color or tones satisfy a suitable threshold value) can be referred to as shadow regions. Moreover, midtone regions can generally show the middle tones of the media content items. As discussed, the disclosed technology can provide color-based dynamic modification of shadows and highlights within media content. It should be appreciated that many variations are possible.

In some implementations, the option module 104 can be further configured to facilitate detecting a selection of at least one of the first option or the second option. For example, the user of computing device can provide a command, such as a touch gesture, a mouse click operation, or a button press, to make the selection of the first option or the second option. In some cases, the user can toggle the selection between the first option to modify the shadow regions and the second option to modify the highlight regions.

It should be understood that there can be many variations or other possibilities associated with the disclosed technology. For example, in some cases, the option module 104 can further provide a third option to modify one or more midtone regions of the media content item and can further detect a selection of the third option.

Moreover, the visual property module 106 can be configured to facilitate providing tools or features for modifying one or more visual properties of the media content item. In some cases, the visual property module 106 can be configured to facilitate providing, based on the selection, at least one set of color swatches for modifying at least one of: 1) the one or more shadow regions or 2) the one or more highlight regions. The visual property module 106 can also be configured to facilitate detecting that a particular color swatch has been selected out of the at least one set of color swatches. More details regarding the visual property module 106 will be provided below with reference to FIG. 2A.

Furthermore, the intensity module 108 can be configured to facilitate detecting a trigger to provide access to an interactive element for adjusting a color intensity associated with the particular color swatch. The intensity module 108 can also be configured to facilitate providing the access to the interactive element based on detecting the trigger. The intensity module 108 will be discussed in more detail with reference to FIG. 2B.

Furthermore, in some embodiments, the multifunctional media modification module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the multifunctional media modification module 102, such as data associated with various media content items and media modifications. It should be appreciated that all examples herein are provided for illustrative purposes and that there can be many variations or other possibilities associated with the disclosed technology.

Figure 2A:
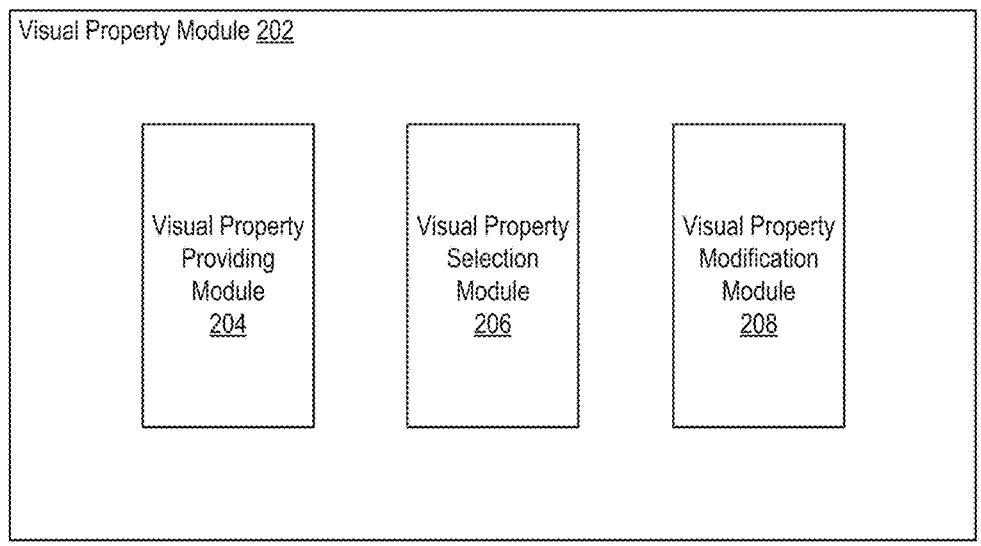
FIG. 2A illustrates an example visual property module configured to facilitate color-based dynamic modification of shadows and highlights within media content, according to an embodiment of the present disclosure.

FIG. 2A illustrates an example visual property module 202 configured to facilitate color-based dynamic modification of shadows and highlights within media content, according to an embodiment of the present disclosure. In some embodiments, the visual property module 106 of FIG. 1 can be implemented as the example visual property module 202. As shown in FIG. 2A, the visual property module 202 can include a visual property providing module 204, a visual property selection module 206, and a visual property modification module 208.

As discussed previously, the visual property module 202 can facilitate providing at least one set of color swatches for modifying at least one of: 1) one or more shadow regions or 2) one or more highlight regions of a media content item. The at least one set of color swatches can, for instance, be provided based on a selection to modify the shadow regions or the highlight regions of the media content item. In some embodiments, the visual property module 202 can utilize the visual property providing module 204 to provide the at least one set of color swatches. For example, if the selection is to modify the shadow regions, then the visual property providing module 204 can provide a first set of color swatches suitable to facilitate modifying the shadow regions. If the selection is to modify the highlight regions, then the visual property providing module 204 can provide a second set of color swatches suitable to facilitate modifying the highlight regions. In some cases, a set of color swatches and/or one or more color swatches (or colors) in the set of color swatches can be set, defined, or specified based on manual effort and/or a machine-learning process.

In some embodiments, the visual property module 202 can enable navigation through the at least one set of color swatches. The at least one set of color swatches can include one or more distinct color swatches. The one or more distinct color swatches can represent one or more distinct colors. The navigation through the at least one set of color swatches can include scrolling through at least some of the one or more distinct color swatches.

Moreover, the visual property module 202 can utilize the visual property selection module 206 to facilitate detecting that a particular color swatch has been selected out of the at least one set of color swatches. The visual property selection module 206 can determine, recognize, or detect that a user has performed an action or command (e.g., a touch gesture, a mouse click operation, a button press, etc.) to select the particular color swatch. For instance, if the user touches his or her finger/stylus with respect to a set of color swatches, swipes across the color swatches, and lifts his or her finger/style at a certain color swatch, the visual property selection module 206 can determine, recognize, or detect that the user has selected that color swatch. Many variations are possible.

Furthermore, the visual property module 202 can utilize the visual property modification module 208 to facilitate dynamically applying a modification to a visual appearance associated with the at least one of: 1) the one or more shadow regions or 2) the one or more highlight regions. The modification can utilize (i.e., utilize at least in part) the selected particular color swatch. The modification can be applied based on the selection to modify the shadow regions or the highlight regions of the media content item. For example, if the selection is to modify the shadow regions, then the visual property modification module 208 can apply a shade or a tint of a color represented in the particular color swatch to the shadow regions in (or near) real-time as the particular color is selected. Likewise, if the selection is to modify the highlight regions, then the visual property modification module 208 can apply a shade or a tint of a color represented in the particular color swatch to the highlight regions in (or near) real-time as the particular color is selected.

Additionally, the visual property module 202 can utilize the visual property modification module 208 to facilitate dynamically presenting a preview for the media content item based on the modification being applied to the visual appearance associated with the at least one of: 1) the one or more shadow regions or 2) the one or more highlight regions. For example, the visual property modification module 208 can cause the preview for the media content item to be displayed in (or near) real-time as the particular color is selected. The preview can illustrate or display how the shadow and/or highlight regions will appear while having applied the shade or the tint of the color represented in the particular color swatch. In some cases, the preview can dynamically illustrate or display modifications to both the shadow regions and the highlight regions. For instance, the shadow regions can be modified with a first shade or tint of a first color represented by a first particular color swatch that has been selected, while the highlight regions can be modified with a second shade or tint of a second color represented by a second particular color swatch that has been selected. It is contemplated that many variations associated with the disclosed technology are possible.

Figure 2B:
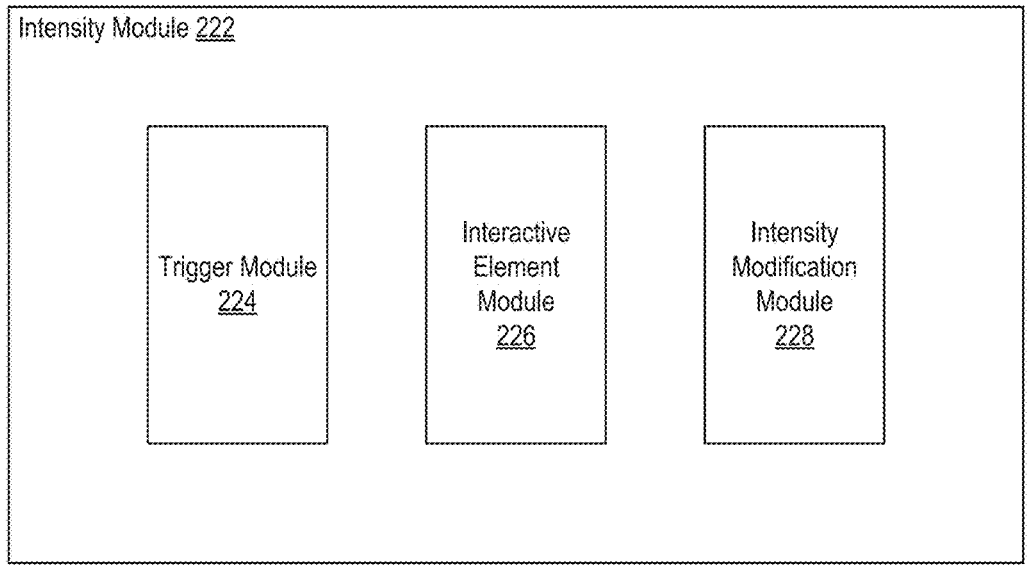
FIG. 2B illustrates an example intensity module configured to facilitate color-based dynamic modification of shadows and highlights within media content, according to an embodiment of the present disclosure.

FIG. 2B illustrates an example intensity module 222 configured to facilitate color-based dynamic modification of shadows and highlights within media content, according to an embodiment of the present disclosure. In some embodiments, the intensity module 108 of FIG. 1 can be implemented as the example intensity module 222. As shown in FIG. 2B, the intensity module 222 can include a trigger module 224, an interactive element module 226, and an intensity modification module 228.

As discussed above, the intensity module 222 can facilitate detecting a trigger to provide access to an interactive element for adjusting a color intensity associated with a particular color swatch. In some embodiments, the intensity module 222 can utilize the trigger module 224 to detect the trigger to provide the access to the interactive element for adjusting the color intensity associated with the particular color swatch. In some cases, the trigger can be associated with at least one of a system setting, a tap gesture, a hold gesture, a swipe gesture, a mouse click operation, a mouse hold operation, a mouse hover operation, or a mouse drag operation, etc. In one example, a user has already selected the particular color swatch. In this example, the trigger module 224 can detect the trigger when the user taps or clicks on the particular color swatch that has already been selected and/or on another button, such as an arrow button or a "Show More" button. In another example, the trigger module 224 can detect the trigger based on a system setting, such as a default configuration to automatically provide the access to the interactive element when the particular color swatch is selected. In yet another example, a system setting can cause the interactive element to be automatically presented in conjunction with (e.g., at the same time as, at least temporarily simultaneously with, etc.) the at least one set of color swatches. In a further example, the trigger module 224 can detect the trigger when the user taps/clicks and holds, or hovers, on the particular color swatch that has already been selected. Again, it should be understood that all examples herein are provided for illustrative purposes and that there can be many variations or other possibilities.

As discussed previously, the intensity module 222 can also facilitate providing the access to the interactive element based on detecting the trigger. In some implementations, the intensity module 222 can utilize the interactive element module 226 to provide, when the trigger is detected, the access to the interactive element. For example, the interactive element module 226 can present or display the interactive element in response to detecting the trigger. In some cases, the interactive element module 226 can present or display the interactive element as a scrollable element, such as a scroll bar. Again, many variations are possible.

Moreover, the interactive element module 226 can be configured to acquire, via the interactive element, a color intensity input to adjust the color intensity associated with the particular color swatch. In one example, the interactive element can be presented or displayed as a scroll bar, which can include a scroll selector element. The user can cause the scroll selector element to move or scroll to a particular color intensity level. In this example, the interactive element module 226 can acquire the color intensity input as corresponding to the particular color intensity level.

Additionally, in some embodiments, the interactive element module 226 can dynamically present at least one of a value representing the color intensity input or a color intensity visualization representing the color intensity input. In one instance, the interactive element module 226 can display in (or near) real-time a number or percentage representing a color intensity specified by the color intensity input. In another instance, the interactive element module 226 can cause at least a portion of the interactive element to be displayed with a color intensity (in association with a particular color represented by the selected particular color swatch) specified by the color intensity input.

In some implementations, the interactive element module 226 can determine at least one of a maximum color intensity level or a minimum color intensity level for the color intensity associated with the particular color swatch. The interactive element module 226 can also associate, respectively, at least one of a maximum endpoint or a minimum endpoint of the interactive element with the at least one of the maximum color intensity level or the minimum color intensity level. The interactive element can correspond to a scrollable element including the maximum endpoint and the minimum endpoint. In some cases, determining the at least one of the maximum color intensity level or the minimum color intensity level can be based on at least one of manual effort or a machine-learning process.

Furthermore, in some embodiments, the intensity module 222 can utilize the intensity modification module 228 to facilitate dynamically updating, based on the color intensity input, a modification to a visual appearance of the media content item. For instance, a shade or a tint of a certain color can be dynamically updated by the intensity modification module 228 to incorporate the color intensity input which affects the color intensity of that certain color. Moreover, in some cases, the intensity modification module 228 can dynamically update a preview for the media content item based on the modification, such that the preview incorporates the color intensity input. As discussed previously, it is contemplated that there can be many variations or other possibilities associated with the disclosed technology.

Figure 3A:
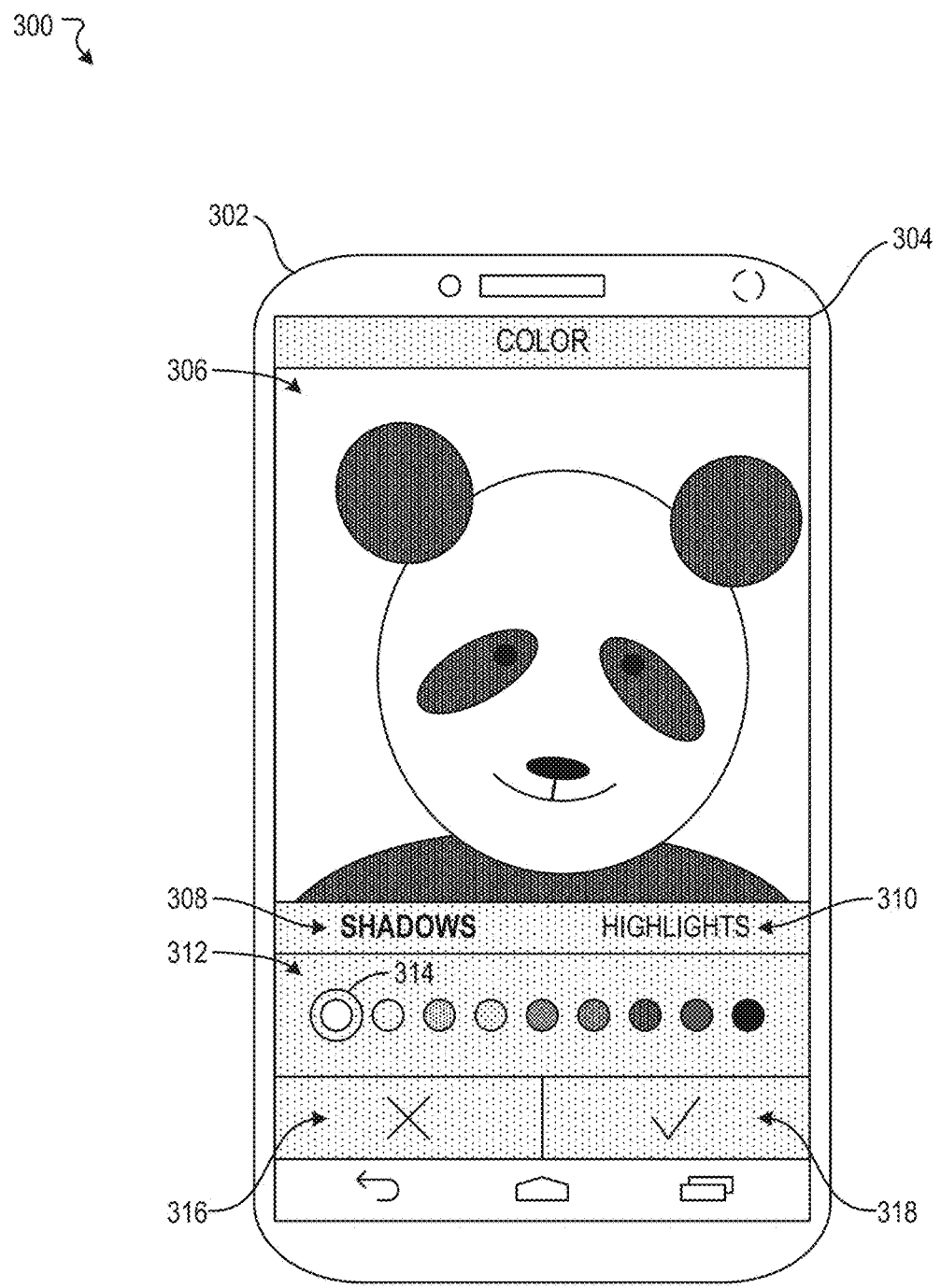
FIG. 3A illustrates an example scenario associated with color-based dynamic modification of shadows and highlights within media content, according to an embodiment of the present disclosure.

FIG. 3A illustrates an example scenario 300 associated with color-based dynamic modification of shadows and highlights within media content, according to an embodiment of the present disclosure. The example scenario 300 of FIG. 3 illustrates an example computing device (or system) 302. As shown, the example device 302 can provide an example interface 304 associated with color-based dynamic modification of shadows and highlights within media content.

In the example scenario 300, the interface 304 can present or display a media content item, such as an image 306. The image 306 can include or depict one or more shadow regions and one or more highlight regions. As shown, the disclosed technology can provide a first option 308 to modify the shadow regions and a second option 310 to modify the highlight regions. In this example, a user of the computing device 302 has made a selection for the first option 308 to modify the shadow regions.

Moreover, the interface 304 can provide a set of color swatches 312 for modifying the shadow regions. In this example, a selector element 314 indicates that no color has been selected for modifying the shadow regions. Furthermore, the interface 304 can present a cancel option 316 as well as a save option 318 (e.g., save any media modifications). It should be appreciated that all examples herein are provided for illustrative purposes and that many variations are possible.

Figure 3B:
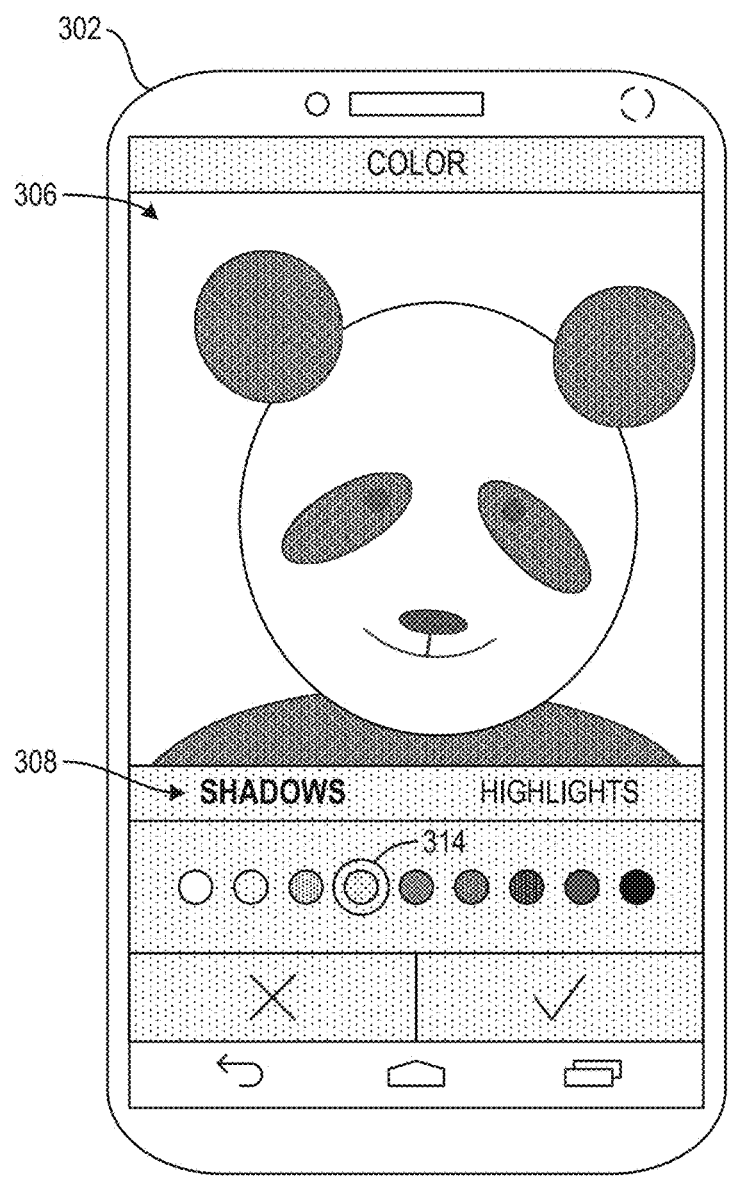
FIG. 3B illustrates an example scenario associated with color-based dynamic modification of shadows and highlights within media content, according to an embodiment of the present disclosure.

FIG. 3B illustrates an example scenario 320 associated with color-based dynamic modification of shadows and highlights within media content, according to an embodiment of the present disclosure. The example scenario 320 illustrates the example computing device 302 of FIG. 3A. In this scenario 320 of FIG. 3B, the user has selected a particular color swatch via the selector element 314. In this example, since the first option 308 has been selected, the shadow regions of the image 306 are shaded or tinted (in/near real-time) by a particular color represented by the selected particular color swatch, whereas the highlights regions are minimally affected (e.g., not affected).

Figure 3C:
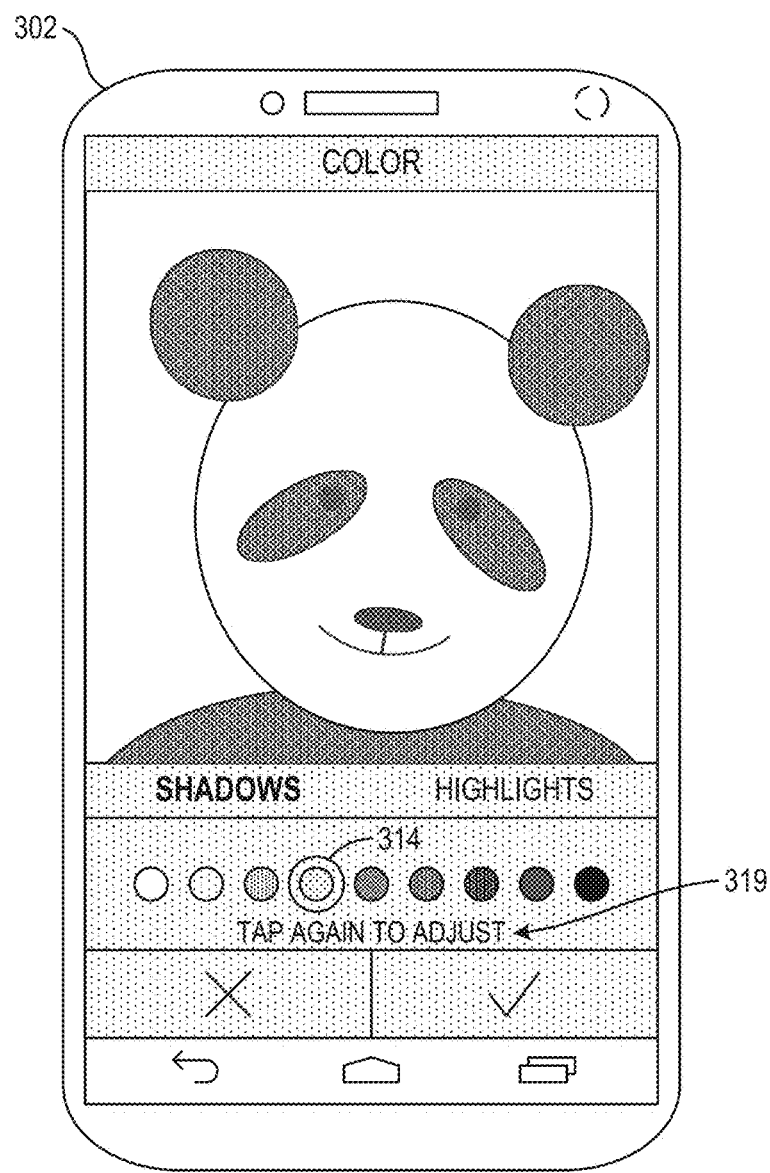
FIG. 3C illustrates an example scenario associated with color-based dynamic modification of shadows and highlights within media content, according to an embodiment of the present disclosure.

FIG. 3C illustrates an example scenario 340 associated with color-based dynamic modification of shadows and highlights within media content, according to an embodiment of the present disclosure. The example scenario 340 illustrates the example computing device 302 of FIG. 3B. In this scenario 340 of FIG. 3C, a message, prompt, or notification 319 can be provided to indicate that a color intensity associated with the particular color swatch (or the particular color represented by the particular color swatch at selector element 314) can be adjusted by the user.

Figure 3D:
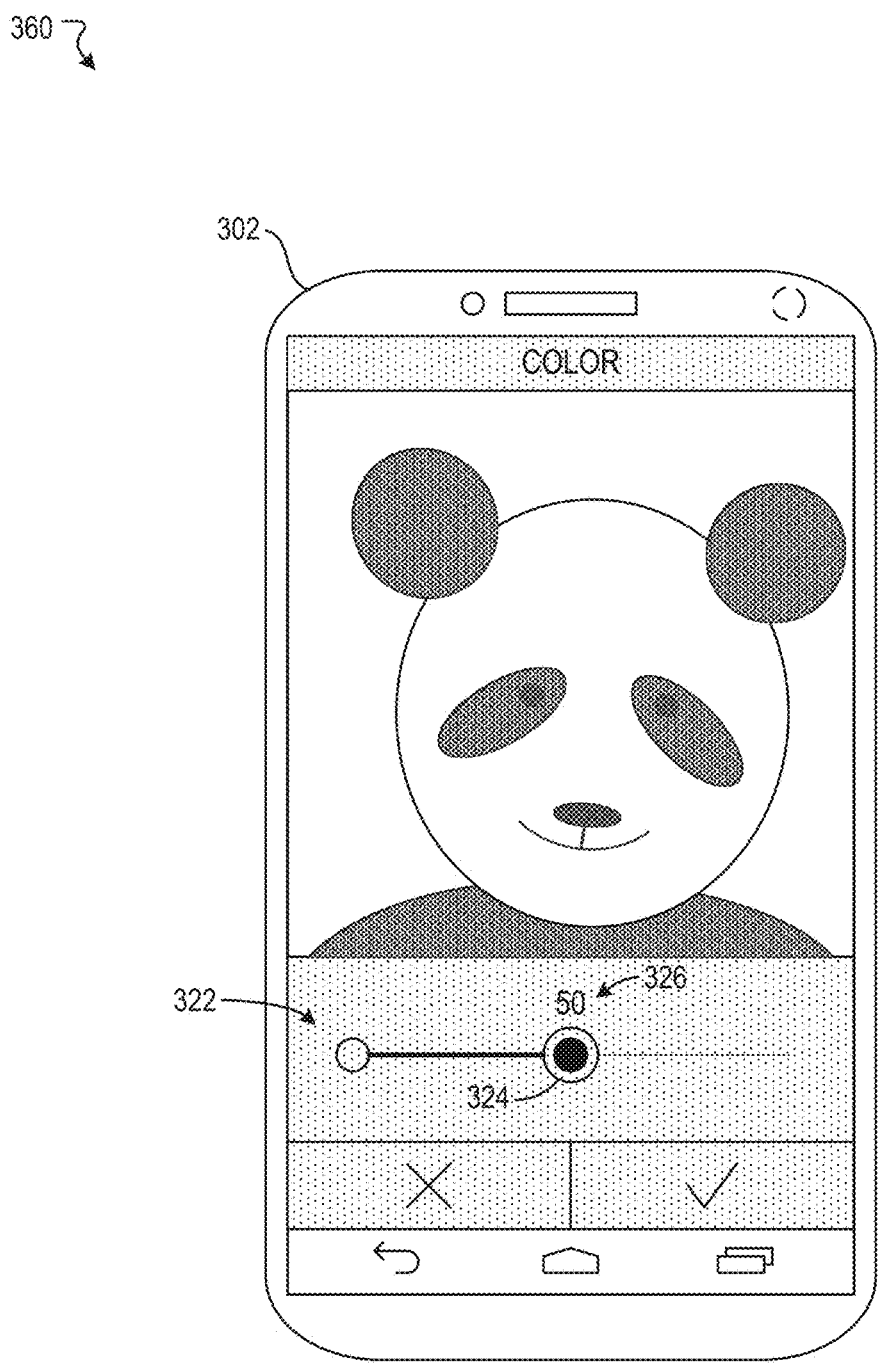
FIG. 3D illustrates an example scenario associated with color-based dynamic modification of shadows and highlights within media content, according to an embodiment of the present disclosure.

FIG. 3D illustrates an example scenario 360 associated with color-based dynamic modification of shadows and highlights within media content, according to an embodiment of the present disclosure. The example scenario 360 illustrates the example computing device 302 of FIG. 3C. In this scenario 360 of FIG. 3D, an interactive element 322 for adjusting the color intensity associated with the particular color swatch can be presented. As shown, the interactive element 322 can correspond to a scrollable element with a scroll selector element 324. Moreover, a value 326 representing a color intensity currently selected via the scroll selector element 324 can be dynamically presented. Again, all examples herein are provided for illustrative purposes and many variations are possible.

Figure 4A:
FIG. 4A illustrates an example scenario associated with color-based dynamic modification of shadows and highlights within media content, according to an embodiment of the present disclosure.

FIG. 4A illustrates an example scenario 400 associated with color-based dynamic modification of shadows and highlights within media content, according to an embodiment of the present disclosure. The example scenario 400 illustrates an example computing device 402, such as the computing device 302 of FIG. 3A. In this example scenario 400 of FIG. 4A, a user of the computing device 402 has selected a particular color swatch (e.g., as shown via a selector element 414) out of a set of color swatches. Moreover, an arrow button 419 can be presented or displayed to indicate that additional options (e.g., features, tools, etc.) are available.

Figure 4B:
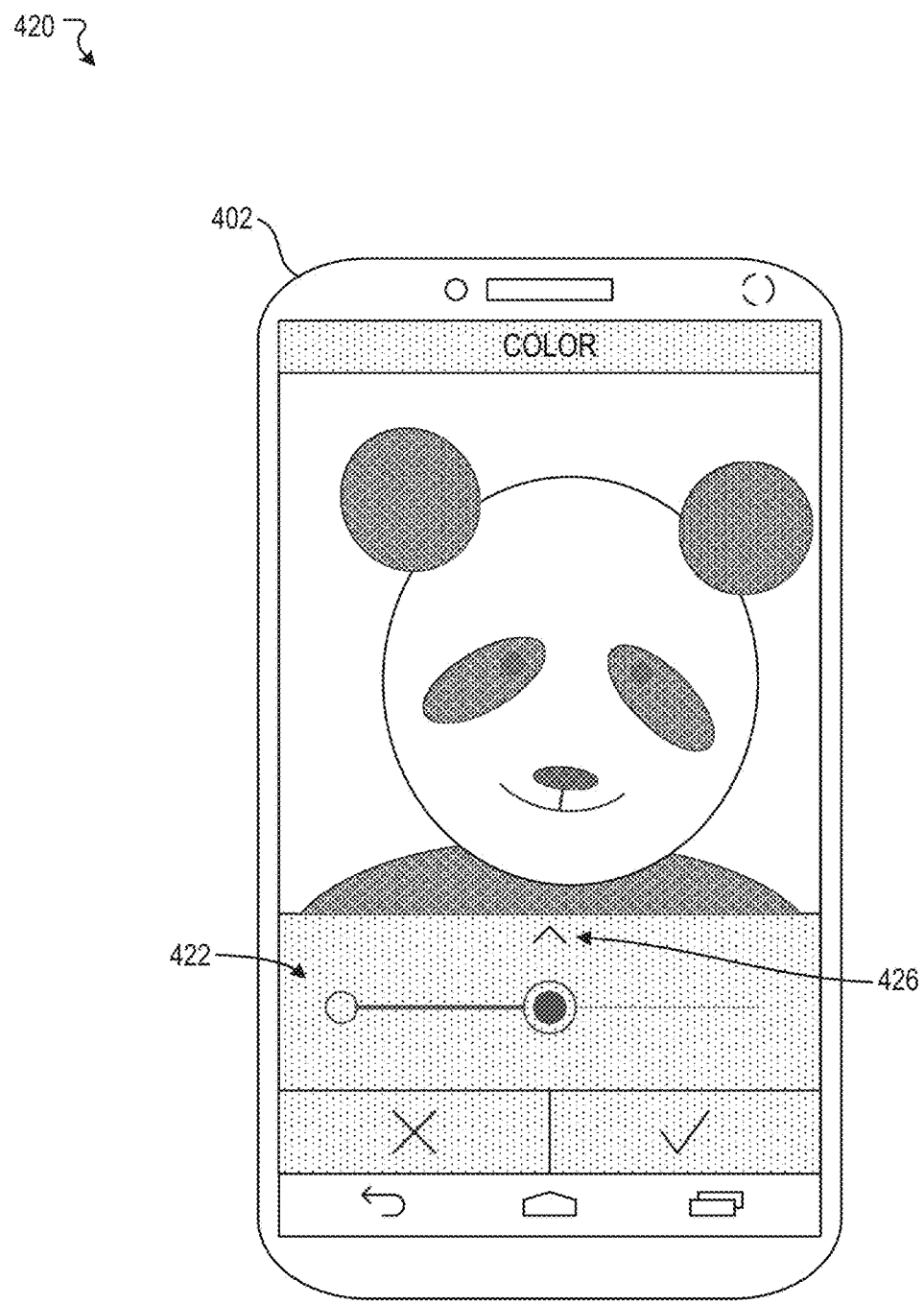
FIG. 4B illustrates an example scenario associated with color-based dynamic modification of shadows and highlights within media content, according to an embodiment of the present disclosure.

FIG. 4B illustrates an example scenario 420 associated with color-based dynamic modification of shadows and highlights within media content, according to an embodiment of the present disclosure. The example scenario 420 illustrates the example computing device 402 of FIG. 4A. In this scenario 420 of FIG. 4B, the user has accessed the additional options, which can include an interactive element 422 for adjusting the color intensity of the selected particular color swatch. Moreover, as shown, at least a portion of the interactive element 422 can be dynamically presented or displayed to have a visualization based on a currently selected color intensity. Furthermore, another arrow button 426 can be provided to enable the user to go back to the set of color swatches. Again, all examples herein are provided for illustrative purposes and many variations are possible.

Figure 5A:
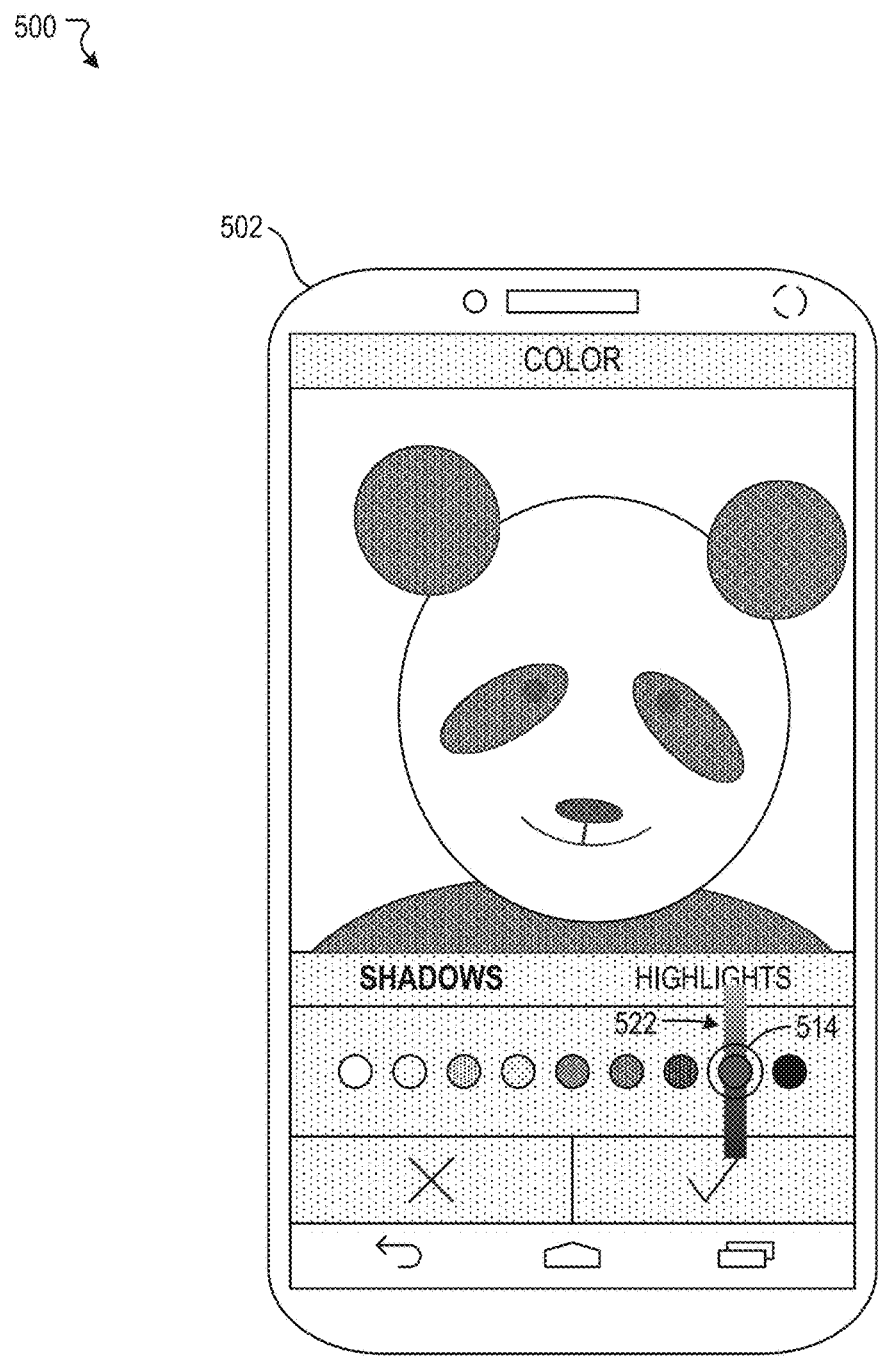
FIG. 5A illustrates an example scenario associated with color-based dynamic modification of shadows and highlights within media content, according to an embodiment of the present disclosure.

FIG. 5A illustrates an example scenario 500 associated with color-based dynamic modification of shadows and highlights within media content, according to an embodiment of the present disclosure. The example scenario 500 illustrates an example computing device 502, such as the computing device 302 of FIG. 3A. In this example scenario 500 of FIG. 5A, a user of the computing device 502 has selected a particular color swatch (e.g., as shown via a selector element 514) out of a set of color swatches. In some cases, when the user taps/clicks and holds at the selector element 514, an interactive element 522 for adjusting the color intensity associated with the particular color swatch can be presented. In this example, while holding, the user can vertically move or scroll the selector element 514 to select a desired color intensity. When the user releases his or her hold, the color intensity can be selected/inputted.

Figure 5B:
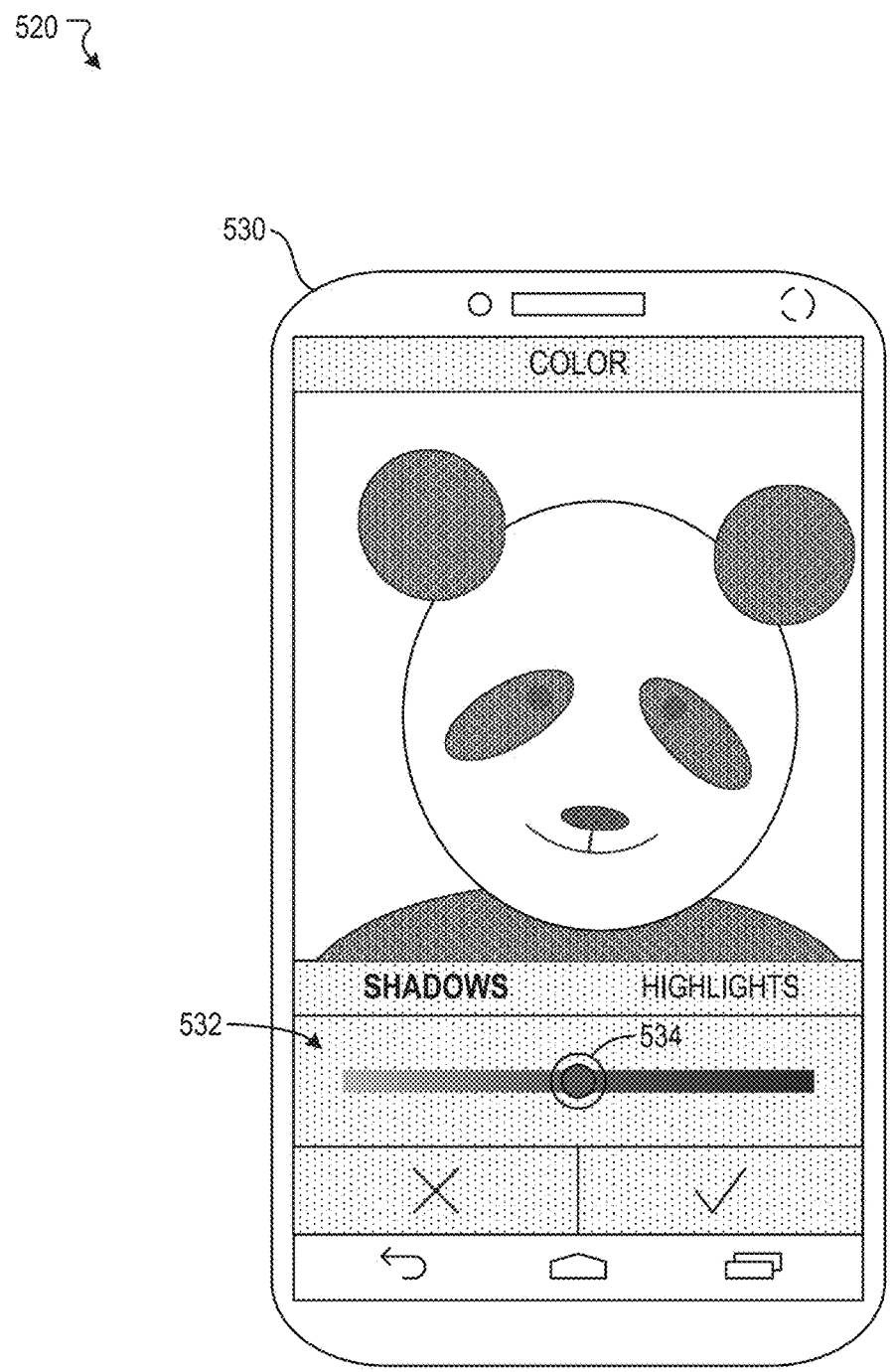
FIG. 5B illustrates an example scenario associated with color-based dynamic modification of shadows and highlights within media content, according to an embodiment of the present disclosure.

FIG. 5B illustrates an example scenario 520 associated with color-based dynamic modification of shadows and highlights within media content, according to an embodiment of the present disclosure. The example scenario 520 illustrates an example computing device 530, such as the computing device 302 of FIG. 3A. In this example scenario 520 of FIG. 5A, a user of the computing device 530 has already selected a particular color swatch out of a set of color swatches. Having tapped/clicked and held on with respect to the already selected particular color swatch, an interactive element 532 for adjusting the color intensity associated with the particular color swatch can be presented. The interactive element 532 can, for instance, correspond to a scrollable element that replaces the set of color swatches. In this example, while holding, the user can horizontally move or scroll a scroll selector element 534 of the scrollable element to select a desired color intensity. When the user releases his or her hold, the color intensity can be selected/inputted and the disclosed technology can revert back to a previous interface portion. As discussed above, all examples herein are provided for illustrative purposes and many variations are possible. The scenarios, embodiments, and examples described in connection with FIGS. 3A-5B also can apply when a user selects a second option (e.g., the second option 310) to modify the highlights regions.

Figure 6A:
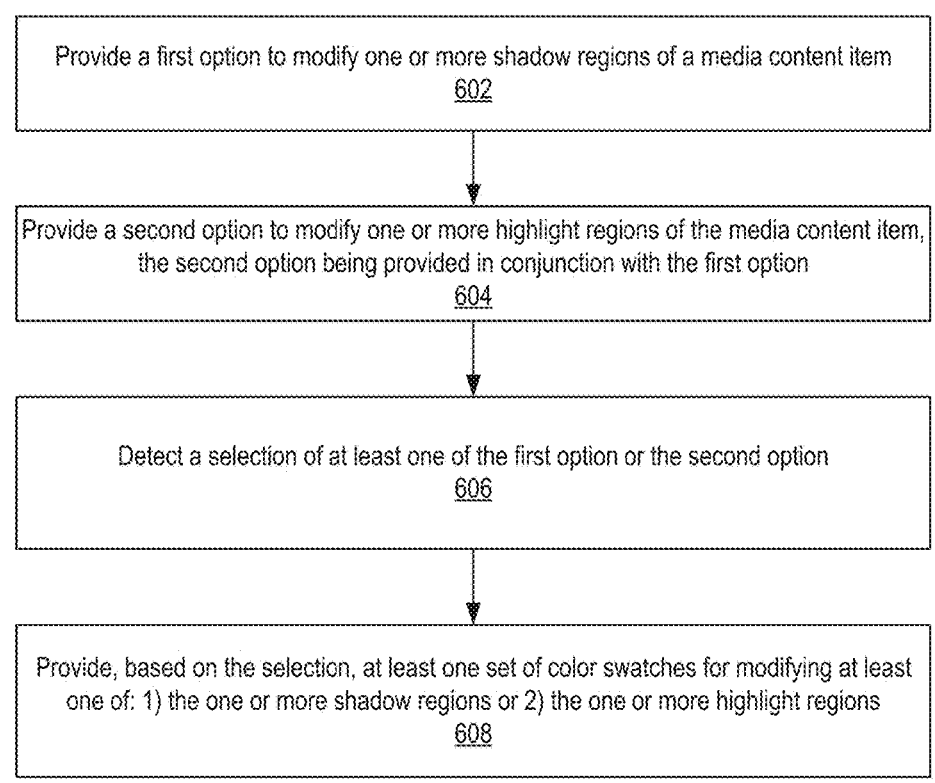
FIG. 6A illustrates an example method associated with color-based dynamic modification of shadows and highlights within media content, according to an embodiment of the present disclosure.

FIG. 6A illustrates an example method 600 associated with color-based dynamic modification of shadows and highlights within media content, according to an embodiment of the present disclosure. It should be appreciated that there can be additional, fewer, or alternative steps performed in similar or alternative orders, or in parallel, within the scope of the various embodiments unless otherwise stated.

At block 602, the example method 600 can provide a first option to modify one or more shadow regions of a media content item. At block 604, the example method 600 can provide a second option to modify one or more highlight regions of the media content item. The second option can be provided in conjunction with the first option. At block 606, the example method 600 can detect a selection of at least one of the first option or the second option. At block 608, the example method 600 can provide, based on the selection, at least one set of color swatches for modifying at least one of: 1) the one or more shadow regions or 2) the one or more highlight regions.

Figure 6B:
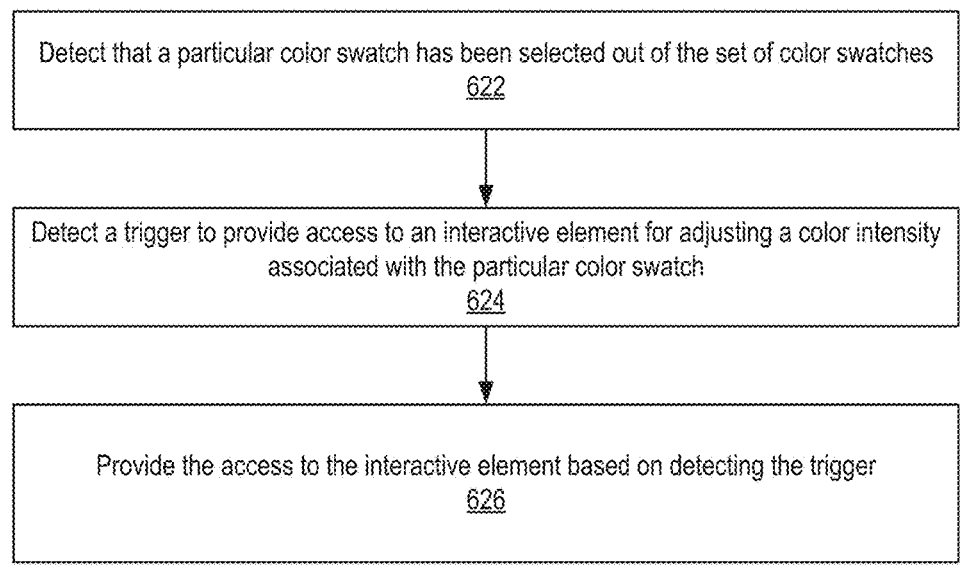
FIG. 6B illustrates an example method associated with color-based dynamic modification of shadows and highlights within media content, according to an embodiment of the present disclosure.

FIG. 6B illustrates an example method 620 associated with color-based dynamic modification of shadows and highlights within media content, according to an embodiment of the present disclosure. As discussed, it should be understood that there can be additional, fewer, or alternative steps performed in similar or alternative orders, or in parallel, within the scope of the various embodiments unless otherwise stated.

At block 622, the example method 620 can detect that a particular color swatch has been selected out of the at least one set of color swatches. At block 624, the example method 620 can detect a trigger to provide access to an interactive element for adjusting a color intensity associated with the particular color swatch. At block 626, the example method 620 can provide the access to the interactive element based on detecting the trigger.

It is contemplated that there can be many other uses, applications, features, possibilities, and/or variations associated with the various embodiments of the present disclosure. For example, in some instances, the disclosed technology can implemented various features based on a detected characteristic or property of a computing device (or system). In some cases, users can choose whether or not to opt-in to utilize the disclosed technology. The disclosed technology can, for instance, also ensure that various privacy settings and preferences are maintained and can prevent private information from being divulged. In another example, various embodiments of the present disclosure can learn, improve, and/or be refined over time.

Social Networking System—Example Implementation

Figure 7:
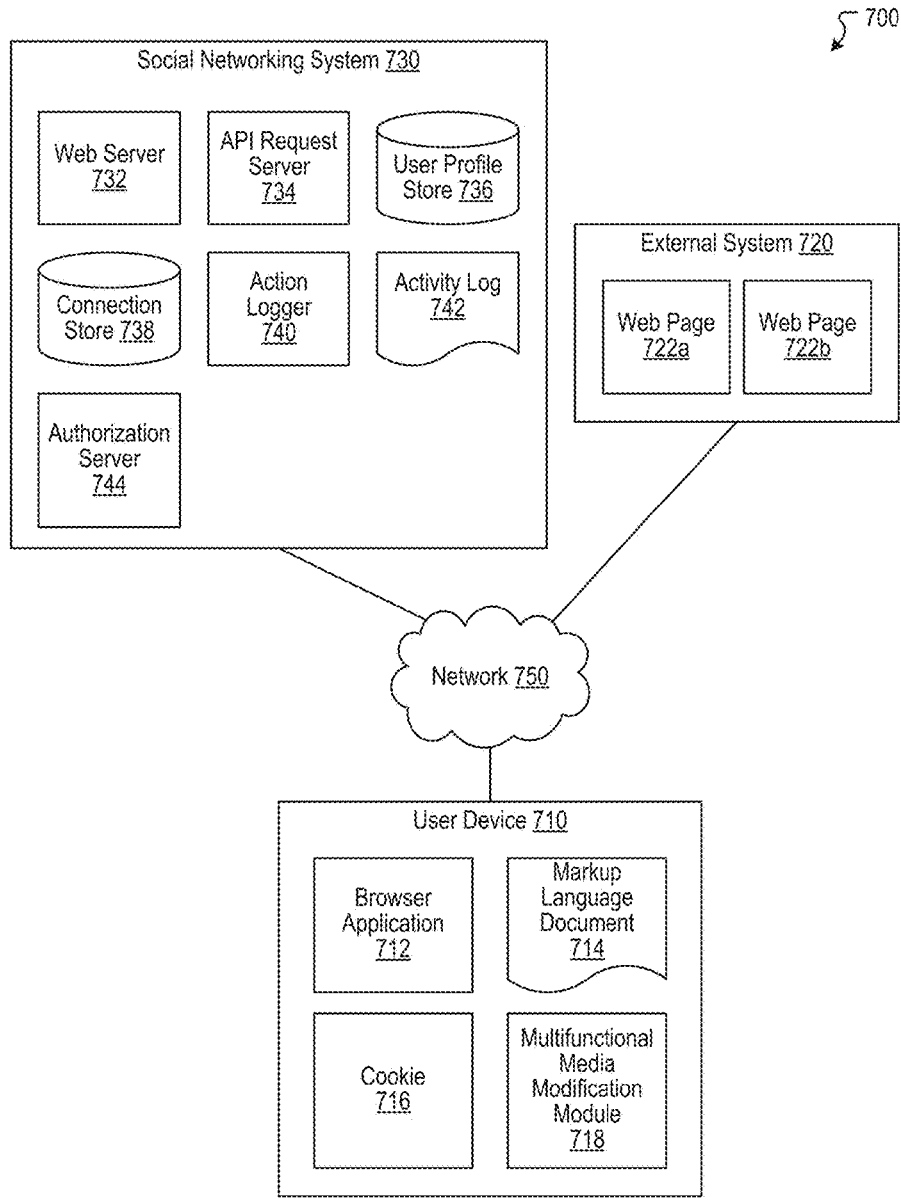
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the user device 710 can include a multifunctional media modification module 718. The multifunctional media modification module 718 can, for example, be implemented as the multifunctional media modification module 102 of FIG. 1. As discussed previously, it should be appreciated that there can be many variations or other possibilities. For example, in some instances, the multifunctional media modification module 718 (or at least a portion thereof) can be included or implemented in the social networking system 730. Other features of the multifunctional media modification module 718 are discussed herein in connection with the multifunctional media modification module 102.

Hardware Implementation

Figure 8:
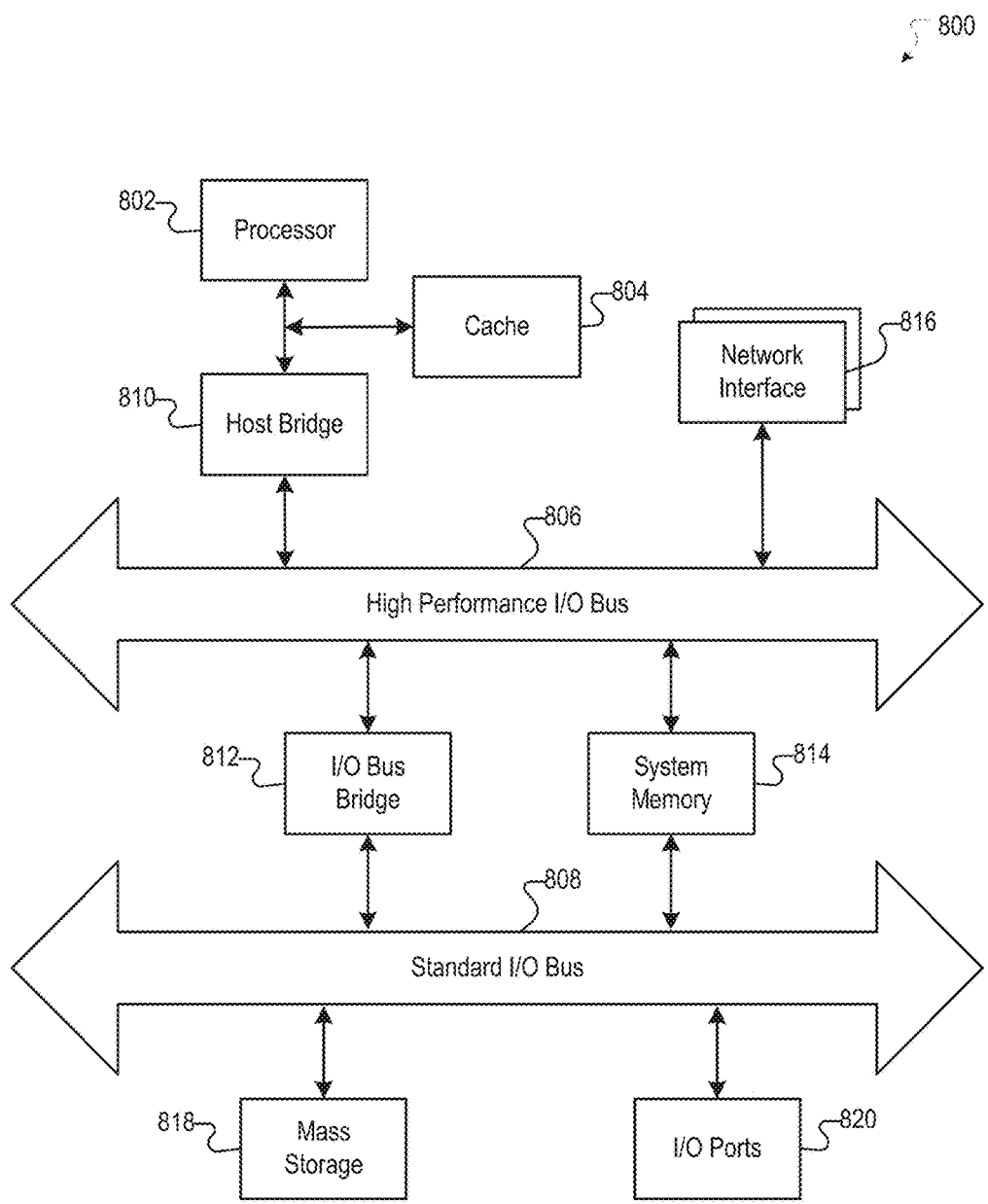
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   providing, by a computing system, in a user interface a first option to modify one or more shadow regions of a media content item;
   providing, by the computing system, in the user interface a second option to modify one or more highlight regions of the media content item, the second option being provided in conjunction with the first option;
   detecting, by the computing system, a selection of at least one of the first option or the second option via the user interface;
   providing, by the computing system, based on the selection, in the user interface at least one set of color swatches for modifying at least one of: 1) the one or more shadow regions or 2) the one or more highlight regions; and
   providing, by the computing system, in response to a selection of a particular color swatch out of the at least one set of color swatches, an interactive element for adjusting a color intensity associated with the particular color swatch.

2. The computer-implemented method of claim 1, further comprising:
   detecting that the particular color swatch has been selected out of the at least one set of color swatches;
   detecting a trigger to provide access to the interactive element for adjusting a color intensity associated with the particular color swatch; and
   providing the access to the interactive element based on detecting the trigger.

3. The computer-implemented method of claim 2, wherein the trigger is associated with at least one of a system setting, a tap gesture, a hold gesture, a swipe gesture, a mouse click operation, a mouse hold operation, a mouse hover operation, or a mouse drag operation.

4. The computer-implemented method of claim 2, further comprising:
   dynamically applying a modification, based on the selection, to a visual appearance associated with the at least one of: 1) the one or more shadow regions or 2) the one or more highlight regions, the modification utilizing, at least in part, the particular color swatch.

5. The computer-implemented method of claim 4, further comprising:
   dynamically presenting a preview for the media content item based on the modification being applied to the visual appearance associated with the at least one of: 1) the one or more shadow regions or 2) the one or more highlight regions.

6. The computer-implemented method of claim 4, further comprising:
acquiring, via the interactive element, a color intensity input to adjust the color intensity associated with the particular color swatch; and
dynamically updating the modification based on the color intensity input.

7. The computer-implemented method of claim 6, further comprising:
dynamically presenting at least one of a value representing the color intensity input or a color intensity visualization representing the color intensity input.

8. The computer-implemented method of claim 6, further comprising:
determining at least one of a maximum color intensity level or a minimum color intensity level for the color intensity associated with the particular color swatch; and
associating, respectively, at least one of a maximum endpoint or a minimum endpoint of the interactive element with the at least one of the maximum color intensity level or the minimum color intensity level, wherein the interactive element corresponds to a scrollable element including the maximum endpoint and the minimum endpoint.

9. The computer-implemented method of claim 8, wherein determining the at least one of the maximum color intensity level or the minimum color intensity level is based on at least one of manual effort or a machine-learning process.

10. The computer-implemented method of claim 1, further comprising:
enabling navigation through the at least one set of color swatches, wherein the at least one set of color swatches includes one or more distinct color swatches, and wherein the navigation through the at least one set of color swatches includes scrolling through at least some of the one or more distinct color swatches.

11. A system comprising:
at least one processor; and
a memory storing instructions that, when executed by the at least one processor, cause the system to perform:
providing in a user interface a first option to modify one or more shadow regions of a media content item;
providing in the user interface a second option to modify one or more highlight regions of the media content item, the second option being provided in conjunction with the first option;
detecting a selection of at least one of the first option or the second option via the user interface;
providing, based on the selection, in the user interface at least one set of color swatches for modifying at least one of: 1) the one or more shadow regions or 2) the one or more highlight regions; and
providing in response to a selection of a particular color swatch out of the at least one set of color swatches, an interactive element for adjusting a color intensity associated with the particular color swatch.

12. The system of claim 11, wherein the instructions cause the system to further perform:
detecting that the particular color swatch has been selected out of the at least one set of color swatches;
detecting a trigger to provide access to the interactive element for adjusting a color intensity associated with the particular color swatch; and
providing the access to the interactive element based on detecting the trigger.

13. The system of claim 12, wherein the instructions cause the system to further perform:
dynamically applying a modification, based on the selection, to a visual appearance associated with the at least one of: 1) the one or more shadow regions or 2) the one or more highlight regions, the modification utilizing, at least in part, the particular color swatch.

14. The system of claim 13, wherein the instructions cause the system to further perform:
dynamically presenting a preview for the media content item based on the modification being applied to the visual appearance associated with the at least one of: 1) the one or more shadow regions or 2) the one or more highlight regions.

15. The system of claim 13, wherein the instructions cause the system to further perform:
acquiring, via the interactive element, a color intensity input to adjust the color intensity associated with the particular color swatch; and
dynamically updating the modification based on the color intensity input.

16. A non-transitory computer-readable storage medium including instructions that, when executed by at least one processor of a computing system, cause the computing system to perform a method comprising:
providing in a user interface a first option to modify one or more shadow regions of a media content item;
providing in the user interface a second option to modify one or more highlight regions of the media content item, the second option being provided in conjunction with the first option;
detecting a selection of at least one of the first option or the second option via the user interface;
providing, based on the selection, in the user interface at least one set of color swatches for modifying at least one of: 1) the one or more shadow regions or 2) the one or more highlight regions; and
providing in response to a selection of a particular color swatch out of the at least one set of color swatches, an interactive element for adjusting a color intensity associated with the particular color swatch.

17. The non-transitory computer-readable storage medium of claim 16, wherein the instructions cause the computing system to further perform:
detecting that the particular color swatch has been selected out of the at least one set of color swatches;
detecting a trigger to provide access to the interactive element for adjusting a color intensity associated with the particular color swatch; and
providing the access to the interactive element based on detecting the trigger.

18. The non-transitory computer-readable storage medium of claim 17, wherein the instructions cause the computing system to further perform:
dynamically applying a modification, based on the selection, to a visual appearance associated with the at least one of: 1) the one or more shadow regions or 2) the one or more highlight regions, the modification utilizing, at least in part, the particular color swatch.

19. The non-transitory computer-readable storage medium of claim 18, wherein the instructions cause the computing system to further perform:

dynamically presenting a preview for the media content item based on the modification being applied to the visual appearance associated with the at least one of: 1) the one or more shadow regions or 2) the one or more highlight regions.

20. The non-transitory computer-readable storage medium of claim 18, wherein the instructions cause the computing system to further perform:
acquiring, via the interactive element, a color intensity input to adjust the color intensity associated with the particular color swatch; and
dynamically updating the modification based on the color intensity input.

* * * * *